United States Patent
Muraoka et al.

(10) Patent No.: US 10,897,784 B2
(45) Date of Patent: Jan. 19, 2021

(54) APPARATUS AND METHOD FOR WIRELESS COMMUNICATION, AND NON-TRANSITORY COMPUTER READABLE MEDIUM STORING PROGRAM

(71) Applicant: NEC Corporation, Tokyo (JP)

(72) Inventors: Kazushi Muraoka, Tokyo (JP); Hiroaki Aminaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 27 days.

(21) Appl. No.: 16/329,809

(22) PCT Filed: Apr. 19, 2017

(86) PCT No.: PCT/JP2017/015648
§ 371 (c)(1),
(2) Date: Mar. 1, 2019

(87) PCT Pub. No.: WO2018/047401
PCT Pub. Date: Mar. 15, 2018

(65) Prior Publication Data
US 2019/0223231 A1    Jul. 18, 2019

(30) Foreign Application Priority Data
Sep. 9, 2016 (JP) .................... 2016-176285

(51) Int. Cl.
*H04W 76/11* (2018.01)
*H04W 72/10* (2009.01)
(Continued)

(52) U.S. Cl.
CPC .............. *H04W 76/11* (2018.02); *H04W 4/70* (2018.02); *H04W 8/00* (2013.01); *H04W 8/005* (2013.01);
(Continued)

(58) Field of Classification Search
CPC ................................ H04W 76/11; H04W 4/70
(Continued)

(56) References Cited

U.S. PATENT DOCUMENTS

2016/0112910 A1* 4/2016 Agiwal ............. H04W 36/0094
370/331
2016/0309447 A1* 10/2016 Agiwal ................. H04L 5/0055
(Continued)

FOREIGN PATENT DOCUMENTS

| WO | 2014087720 A1 | 6/2014 |
|----|---------------|--------|
| WO | 2015142431 A1 | 9/2015 |
| WO | 2016136493 A1 | 9/2016 |

OTHER PUBLICATIONS

International Search Report, dated Jul. 11, 2017 from the International Bureau in counterpart International application No. PCT/JP2017/015648.
(Continued)

*Primary Examiner* — Peter G Solinsky (57) ABSTRACT

A base station (2) is configured to receive, from a first wireless terminal (1), a first group identifier indicating a first terminal group, and allocate, to the first wireless terminal (1), a second radio resource, rather than a first radio resource, for device-to-device (D2D) communication performed by the first wireless terminal (1). The first radio resource is a radio resource which has already been allocated to any other wireless terminal which has sent the first group identifier. Meanwhile, the second radio resource is a radio resource which has already been allocated to any other wireless terminal which has sent a second group identifier indicating a second terminal group different from the first terminal group. It is thus, for example, possible to preventing a plurality of D2D communication signals, which are transmitted from multiple wireless terminals to a single
(Continued)

wireless terminal, from being transmitted on the same radio resource.

18 Claims, 8 Drawing Sheets

(51) Int. Cl.
*H04W 8/00* (2009.01)
*H04W 92/18* (2009.01)
*H04W 4/70* (2018.01)
*H04W 76/27* (2018.01)
*H04W 88/02* (2009.01)
*H04W 88/04* (2009.01)
*H04W 88/08* (2009.01)

(52) U.S. Cl.
CPC .......... *H04W 72/10* (2013.01); *H04W 76/27* (2018.02); *H04W 88/023* (2013.01); *H04W 88/04* (2013.01); *H04W 88/085* (2013.01); *H04W 92/18* (2013.01)

(58) Field of Classification Search
USPC ........................................................ 370/329
See application file for complete search history.

(56) References Cited

U.S. PATENT DOCUMENTS

| | | | |
|---|---|---|---|
| 2016/0338095 A1* | 11/2016 | Faurie | H04W 28/0278 |
| 2018/0103417 A1* | 4/2018 | Choi | H04W 88/02 |
| 2018/0139724 A1* | 5/2018 | Loehr | H04W 72/02 |
| 2018/0152234 A1* | 5/2018 | Huang | H04W 76/23 |
| 2018/0206110 A1* | 7/2018 | Chaki | H04W 40/32 |
| 2019/0159018 A1* | 5/2019 | Basu Mallick | H04W 88/04 |

OTHER PUBLICATIONS

3 GPP TS 36.331 V13.2.0 (Jun. 2016), "3rd Generation Partnership Project; Technical Specification Group Radio Access Network; Evolved Universal Terrestrial Radio Access (E-UTRA); Radio Resource Control (RRC); Protocol specification (Release 13)", Jun. 2016, pp. 1-623.

3GPP TS 36.300 V13.4.0 (Jun. 2016), "3rd Generation Partnership Project ; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Jun. 2016, pp. 1-310.

3GPP TS 23.303 V13.4.0 (Jun. 2016), 3rd Generation Partnership Project; Technical Specification Group Services and System Aspects; Proximity-based services (ProSe); Stage 2 (Release 13), Jun. 2016, pp. 1-124.

* cited by examiner

APPARATUS AND METHOD FOR WIRELESS COMMUNICATION, AND NON-TRANSITORY COMPUTER READABLE MEDIUM STORING PROGRAM

This application is a National Stage Entry of PCT/JP2017/015648 filed on Apr. 19, 2017, which claims priority from Japanese Patent Application 2016-176285 filed on Sep. 9, 2016, the contents of all of which are incorporated herein by reference, in their entirety.

TECHNICAL FIELD

The present disclosure relates to inter-terminal direct communication (device-to-device (D2D) communication) and, in particular, to allocation of radio resources for D2D communication.

BACKGROUND ART

A type of communication in which a wireless terminal directly communicates with another wireless terminal without traversing an infrastructure network such as a base station is referred to as device-to-device (D2D) communication. The D2D communication includes at least one of Direct Communication and Direct Discovery. In some implementations, a plurality of wireless terminals supporting D2D communication form a D2D communication group autonomously or under the control of a network, and communicate with another wireless terminal in the formed D2D communication group.

Proximity-based services (ProSe) specified in 3GPP Release 12 and Release 13 are examples of the D2D communication. ProSe Direct Discovery is performed through a procedure in which a wireless terminal capable of performing ProSe (i.e., ProSe-enabled User Equipment (UE)) discovers another ProSe-enabled UE only by using the capability of a radio communication technology (e.g., Evolved Universal Terrestrial Radio Access (E-UTRA) technology) of those two UEs. ProSe Direct Discovery may be performed by three or more ProSe-enabled UEs.

There are models A and B for ProSe direct discovery. In the model A, an announcing UE broadcasts predetermined information, while a monitoring UE attempts to receive this information. The monitoring UE discovers the announcing UE by receiving the certain information or discovery signal from the announcing UE. In contrast, in the model B, a discoverer UE sends a request or solicitation containing predetermined information and a discoveree UE receives this request or solicitation message containing the predetermined information and then replies with a response message associated with the request. That is the discovery in the model A is achieved only by unidirectional transmission from one UE to another UE, while the discovery in the model B is achieved by bidirectional transmissions between UEs. The model A is also referred to as an announcement model, while the model B is also referred to as a solicitation/response model.

ProSe Direct Communication makes it possible, for example, to establish a communication path(s) between two or more ProSe-enabled UEs existing in a direct communication range after the ProSe Direct Discovery procedure is performed. Stated differently, ProSe Direct Communication enables a ProSe-enabled UE to directly communicate with another ProSe-enabled UE without going through a Public Land Mobile Network (PLMN)) including a base station (eNodeB (eNB)). ProSe Direct Communication may be performed by using a radio communication technology (i.e., E-UTRA technology) that is also used to access an eNB or by using a Wireless Local Area Network (WLAN) radio technology (i.e., IEEE 802.11 radio technology).

In 3GPP Release 12 and Release 13, a radio link between terminals (i.e., UEs) used for Direct Communication or Direct Discovery is referred to as Sidelink. Sidelink transmission uses the Long Term Evolution (LTE) frame structure defined for uplink and downlink and uses a subset of uplink resources in frequency and time domains. A wireless terminal (i.e., UE) performs sidelink transmission by using Single Carrier FDMA (Frequency Division Multiple Access) (SC-FDMA), which is the same as used in uplink.

In 3GPP ProSe, allocation of radio resources to a UE for sidelink transmission is performed by a radio access network (e.g., Evolved Universal Terrestrial Radio Access Network (E-UTRAN)). A UE that has been permitted to perform sidelink communication by a ProSe function performs ProSe Direct Discovery or ProSe Direct Communication by using radio resources allocated by a radio access network node (e.g., eNodeB (eNB)).

Regarding ProSe direct discovery, two resource allocation modes, i.e., autonomous resource selection and scheduled resource allocation are specified. The autonomous resource selection and the scheduled resource allocation are referred to as "sidelink discovery Type 1" and "sidelink discovery Type 2", respectively.

In the autonomous resource selection for ProSe direct discovery (i.e., sidelink discovery Type 1), a UE that desires transmission (announcing) of a discovery signal (i.e., Physical Sidelink Shared Channel (PSDCH)) autonomously selects radio resources from a resource pool.

In the scheduled resource allocation for ProSe direct discovery (i.e., sidelink discovery Type 2), a UE requests an eNodeB to allocate resources for announcement via RRC signaling. The eNodeB allocates resources for announcement selected from a resource pool to the UE. When the scheduled resource allocation is used, the eNodeB indicates in a System Information Block (SIB 19) that it provides resources for monitoring of ProSe direct discovery but does not provide resources for announcement.

A resource pool for ProSe direct discovery is referred to as a discovery resource pool and is configured in UEs by an eNB via broadcast (SIB 19) or dedicated signaling (RRC signaling). The discovery resource pool consists of $L_{PSDCH}$ subframes and $M^{PSDCH\_RP}{}_{RB}$ frequency domain resource blocks in a discovery period. The discovery period is also referred to as a PSDCH period.

Regarding the sidelink discovery Type 2, though two types, i.e., Type 2A and Type 2B had been discussed, only Type 2B is specified in the current Release 12 and Release 13. In Type 2B, an eNB allocates radio resources for transmission of a discovery signal (PSDCH) to a UE in a semi-persistent manner. In contrast to this, in Type 2A, which is not specified in the current 3GPP Release 12 and Release 13, an eNB allocates radio resources for transmission of a discovery signal (PSDCH) dynamically to a UE in each discovery period (i.e., PSDCH period).

As for ProSe Direct Communication, two resource allocation modes, i.e., scheduled resource allocation and autonomous resource selection, are defined. The scheduled resource allocation and the autonomous resource selection are referred to as "sidelink transmission mode 1" and "sidelink transmission mode 2", respectively.

In the scheduled resource allocation for ProSe Direct Communication, when a UE desires to perform sidelink transmission, this UE requests an eNB to allocate radio resources for sidelink transmission, and the eNB allocates resources for sidelink control and data to the UE. To be specific, a UE transmits to an eNB a scheduling request to request an uplink (UL) data transmission resource (i.e., Uplink Shared Channel (UL-SCH) resource) and then transmits a Sidelink Buffer Status Report (Sidelink BSR) to the eNB by using an UL data transmission resource allocated by an uplink grant (UL grant). The eNB determines sidelink transmission resources to be allocated to the UE based on the Sidelink BSR and transmits a sidelink grant (SL grant) to the UE.

The SL grant is defined as Downlink Control Information (DCI) format 5. The SL grant (i.e., DCI format 5) contains contents such as a Resource for PSCCH, Resource block assignment and hopping allocation, and a time resource pattern index. The Resource for PSCCH indicates radio resources for a sidelink control channel (i.e., Physical Sidelink Control Channel (PSCCH)). The Resource block assignment and hopping allocation is used to determine frequency resources, i.e., a set of subcarriers (resource blocks), for transmitting a sidelink data channel (i.e., Physical Sidelink Shared Channel (PSSCH)) for sidelink data transmission. The Time resource pattern index is used to determine time resources, i.e., a set of subframes, for transmitting the PSSCH. Note that, strictly speaking, the resource block means time-frequency resources in LTE and LTE-Advanced and is a unit of resources specified by consecutive OFDM (or SC-FDMA) symbols in the time domain and consecutive subcarriers in the frequency domain. In the case of Normal cyclic prefix, one resource block includes 12 consecutive OFDM (or SC-FDMA) symbols in the time domain and 12 subcarriers in the frequency domain. That is, the Resource block assignment and hopping allocation and the Time resource pattern index designate a resource block for transmitting the PSSCH. The UE (i.e., a sidelink transmitting terminal) determines a PSCCH resource and a PSSCH resource according to the SL grant.

On the other hand, in the autonomous resource selection for ProSe Direct Communication, a UE autonomously selects resources for sidelink control (i.e., PSCCH) and data (i.e., PSSCH) from a resource pool(s) set by an eNB. The eNB may allocate a resource pool(s) for the autonomous resource selection to the UE in a System Information Block (SIB) 18. The eNB may allocate a resource pool for the autonomous resource selection to the UE in Radio Resource Control (RRC) CONNECTED by dedicated RRC signaling. This resource pool may be usable also when the UE is in RRC_IDLE.

Furthermore, 3GPP Release 12 specifies a partial coverage scenario in which one UE is located out of the network coverage and the other UE is located in the network coverage. In the partial coverage scenario, a UE that is out of coverage is referred to as a "remote UE" or "sidelink remote UE", while a UE that is in coverage and acts as a relay between the remote UE and the network is referred to as a "ProSe UE-to-Network Relay" or "sidelink relay UE". The ProSe UE-to-Network Relay relays traffic (downlink and uplink) between the remote UE and the network (i.e., E-UTRAN and Evolved Packet Core (EPC)).

More specifically, the ProSe UE-to-Network Relay attaches to the network as a UE, establishes a PDN connection to communicate with a ProSe function entity or another Packet Data Network (PDN), and communicates with the ProSe function entity to start ProSe Direct Communication. The ProSe UE-to-Network Relay further performs the discovery procedure with the remote UE, communicates with the remote UE on the inter-UE direct interface (e.g., sidelink or PC5 interface), and relays traffic (downlink and uplink) between the remote UE and the network. When the Internet Protocol version 4 (IPv4) is used, the ProSe UE-to-Network Relay serves as a Dynamic Host Configuration Protocol Version 4 (DHCPv4) Server and Network Address Translation (NAT). When the IPv6 is used, the ProSe UE-to-Network Relay serves as a stateless DHCPv6 Relay Agent. The remote UE can use ProSe direct discovery to find the ProSe UE-to-Network Relay. Such discovery is referred to as ProSe UE-to-Network Relay Discovery.

In this specification, a wireless terminal that has the ProSe function and the relay function such as the ProSe UE-to-Network Relay is referred to as a "relay wireless terminal" or a "relay UE". Further, a wireless terminal that is served with the relay service by the relay wireless terminal (relay UE) is hereinafter referred to as a "remote wireless terminal" or a "remote UE". The remote UE is also referred to as a relayed terminal.

Further, 3GPP Release 13 includes extensions of ProSe (see, for example, Non-patent Literatures 1 to 3). Non-patent Literature 1 specifies functions and procedures, related to ProSe discovery and ProSe direct communication, supported by ProSe-enabled UEs, a ProSe application server, and a core network including ProSe function, Mobility Management Entity (MME), Home Subscriber Server (HSS), Serving Gateway (S-GW), and Packet Data Network Gateway (P-GW). Non-patent Literature 2 specifies E-UTRAN radio interface protocol architecture for ProSe discovery (i.e., sidelink discovery) and ProSe direct communication (i.e., sidelink communication). More specifically, Sections 23.10 and 23.11 of Non-patent Literature 2 specify support of sidelink discovery and sidelink communication. Non-patent Literature 3 specifies RRC protocols for a radio interface between a UE and an E-UTRAN and also specifies enhancements to the RRC protocols to support sidelink discovery and sidelink communication (see, for example, Sections 5.3.10.15 and 5.10).

CITATION LIST

Non Patent Literature

[Non-Patent Literature 1] 3GPP TS 23.303 V13.4.0 (2016-06), "3rd Generation Partnership Project; Technical Specification Group Services and System Aspects; Proximity-based services (ProSe); Stage 2 (Release 13)", June 2016

[Non-Patent Literature 2] 3GPP TS 36.300 V13.4.0 (2016-06), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", June 2016

[Non-Patent Literature 3] 3GPP TS 36.331 V13.2.0 (2016-06), "3rd Generation Partnership Project; Technical Specification Group Radio Access Network; Evolved Universal Terrestrial Radio Access (E-UTRA); Radio Resource Control (RRC); Protocol specification (Release 13)", June 2016

SUMMARY OF INVENTION

Technical Problem

The present inventor has found several problems regarding the ProSe direct discovery model B. As described earlier, in the ProSe direct discovery model B, a discoverer UE transmits request containing predetermined information, and a discoveree UE receives this request and then replies with information associated with the request. The discoverer UE can transmit information about UEs from which the discoverer UE desires to receive a response. This information may be, for example, an identifier associated with a group or members belonging thereto. More specifically, this information may be a ProSe Application Code, a Relay Service Code, or a Discovery Group Identifier (ID). Thus, in the ProSe direct discovery model B, multiple discoveree UEs could possibly transmit their respective responses to a discoverer UE substantially at the same time. In other words, in the ProSe direct discovery model B, many-to-one communication from multiple discoveree UEs to one discoverer UE could occur. If multiple responses from multiple discoveree UEs are transmitted on the same radio resource, the discoverer UE could fail to receive these responses from the discoveree UEs and thus could possibly fail to detect the discoveree UEs.

Note that, this problem can occur not only in the ProSe direct discovery model B but also in other D2D communications. Specifically, this problem can occur also in many-to-one D2D communication involving simultaneous transmission from multiple wireless terminals to a single wireless terminal.

In view of the above, one object to be attained by embodiments disclosed herein is to provide an apparatus, a method, and a program that contribute to preventing a plurality of D2D communication signals, which are transmitted from multiple wireless terminals to a single wireless terminal, from being transmitted on the same radio resource.

Solution to Problem

In a first aspect a base station includes at least one memory and at least one processor coupled to the at least one memory. The at least one processor is configured to receive, from a first wireless terminal, a first group identifier indicating a first terminal group, and allocate, to the first wireless terminal, a second radio resource, rather than a first radio resource, for device-to-device (D2D) communication performed by the first wireless terminal. The first radio resource is a radio resource which has already been allocated to any other wireless terminal which has sent the first group identifier. The second radio resource is a radio resource which has already been allocated to any other wireless terminal which has sent a second group identifier indicating a second terminal group different from the first terminal group.

In a second aspect, a method performed by a base station includes (a) receiving, from a first wireless terminal, a first group identifier indicating a first terminal group, and (b) allocating, to the first wireless terminal, a second radio resource, rather than a first radio resource, for device-to-device (D2D) communication performed by the first wireless terminal. The first radio resource is a radio resource which has already been allocated to any other wireless terminal which has sent the first group identifier. The second radio resource is a radio resource which has already been allocated to any other wireless terminal which has sent a second group identifier indicating a second terminal group different from the first terminal group.

In a third aspect, a program includes a set of instructions (or software codes) that, when loaded into a computer, causes the computer to perform a method according to the above-described second aspect.

Advantageous Effects of Invention

According to the above-deceived aspects, it is possible to provide an apparatus, a method, and a program that contribute to preventing a plurality of D2D communication signals, which are transmitted from multiple wireless terminals to a single wireless terminal, from being transmitted on the same radio resource.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on specific examples with regard to improvements of ProSe specified in 3GPP Release 12 (LTE-Advanced) and Release 13 (LTE-Advanced Pro). However, these embodiments are not limited to the LTE-Advanced and LTE-Advanced Pro and these improvements and may also be applied to D2D communication in other mobile communication networks or systems.

First Embodiment

Figure 1:
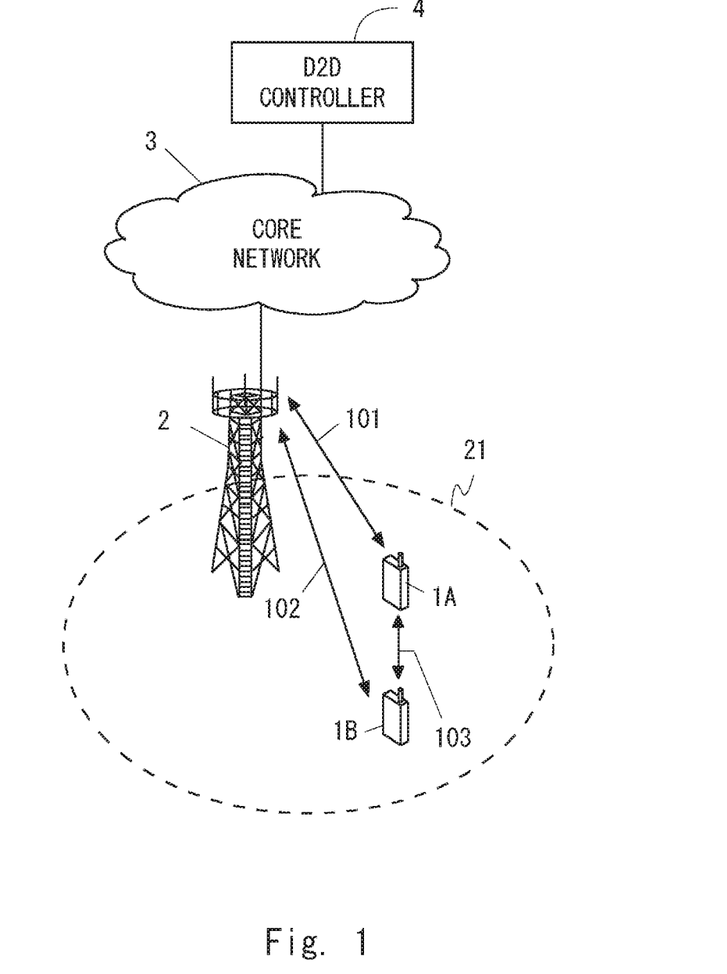
FIG. 1 is a diagram showing a configuration example of a radio communication network according to a first embodiment.

FIG. 1 shows a configuration example of a radio communication network according to this embodiment. UEs 1A and 1B each include at least one radio transceiver and are configured to perform cellular communication (101 or 102) with a base station 2 and perform D2D communication on an inter-terminal direct interface (i.e., PC5 interface or sidelink) 103. The D2D communication at least includes direct discovery (i.e., ProSe direct discovery or sidelink discovery) and may further include direct communication (i.e., ProSe direct communication or sidelink communication).

The eNB 2 is an entity located in a radio access network (i.e., E-UTRAN), and it provides cellular coverage 21 containing one or a plurality of cells. The eNB 2 can perform cellular communication (101 or 102) with each of the UEs 1 by using cellular communication technology (i.e., E-UTRA technology).

A core network (i.e., Evolved Packet Core (EPC)) 3 includes a plurality of user plane entities (e.g., S-GW and P-GW) and a plurality of control plane entities (e.g., MME and HSS). The user plane entities relay user data of the UE 1A and the UE 1B between an external network and the radio access network including the eNB 2. The control plane entities perform various types of control for the UEs 1A and 1B, which includes mobility management, session management (bearer management), subscriber information management, and charging management.

In some implementations, the UE 1A and the UE 1B are configured to communicate with a D2D controller 4 through the eNB 2 and the core network 3 to use a proximity-based service (i.e., 3GPP ProSe). For example, in the case of 3GPP ProSe, the D2D controller 4 is equivalent to a ProSe function entity. For example, the UE 1A and the UE 1B may send a request for ProSe direct discovery (i.e., ProSe Direct Discovery Request) to the D2D controller 4, receive authorization for ProSe direct discovery from the D2D controller 4, and also receive configuration information related to ProSe direct discovery from the D2D controller 4. The configuration information related to ProSe direct discovery contains, for example, a ProSe Application Code(s), or a Discovery Filter(s) composed of a ProSe Application Code(s) and a ProSe Application Mask(s), or both.

Specifically, in the case of the model B discovery, a discoverer UE receives a ProSe Query Code and one or more Discovery Response Filters, each composed of a ProSe Response Code(s) and a ProSe Application Mask(s), from the D2D controller (ProSe function) 4. The discoverer UE then announces the ProSe Query Code on the PC5 interface (i.e., sidelink) and monitors any ProSe Response Code(s) that matches the one or more Discovery Response Filters on the PC5 interface. Meanwhile, a discoveree UE receives a ProSe Response Code and one or more Discovery Query Filters from the D2D controller (ProSe function) 4. The discoveree UE monitors ProSe Query Codes on the PC5 interface, and when the received ProSe Query Code matches any one of the Discovery Query Filters, announces the ProSe Response Code associated with it on the PC5 interface.

To be more specific, in the case of the model B group member discovery, the discoverer UE transmits a Group Member Discovery Solicitation message (Model B). This Solicitation message contains a Discoverer Info, a Discovery Group ID, and a Target Info. The Discoverer Info provides information about a discoverer user. The Discovery Group ID is an identifier (ID) of a discovery group to which a targeted UE should belong. The Target Info provides information about targeted discoverees (single user or group). One or more discoveree UEs that match the value of the Discovery Group ID contained in the received Solicitation message each reply to the discoverer UE by using a Group Member Discovery Response message (Model B). This Response message contains a ProSe UE ID, a Discoveree Info, and a Discovery Group ID. The ProSe UE ID is a link layer identifier to be used for subsequent direct one-to-one and one-to-many communication. The Discoveree Info provides information about a discoveree. The Discovery Group ID is an identifier of a discovery group to which the discoveree UE belongs.

In the case of the model B relay discovery (i.e., UE-to-Network Relay Discovery), a remote UE (discoverer) transmits a UE-to-Network Relay Discovery Solicitation message (Model B). This Solicitation message contains a Discoverer Info and a Relay Service Code. The Discoverer Info provides information about a discoverer user. The Relay Service Code is information about connectivity which the discoverer UE is interested in. One or more ProSe UE-to-Network Relays (Discoverees) that match the value of the Relay Service Code contained in the received Solicitation message each reply to the remote UE by using a UE-to-Network Relay Discovery Response message (Model B). This Response message contains a ProSe Relay UE ID and a Discoveree Info. The ProSe Relay UE ID is a link layer identifier of a relay UE (i.e., UE-to-Network Relay) that is to be used for direct communication and is associated with the Relay Service Code. The Discoveree Info provides information about a discoveree.

Figure 2A:
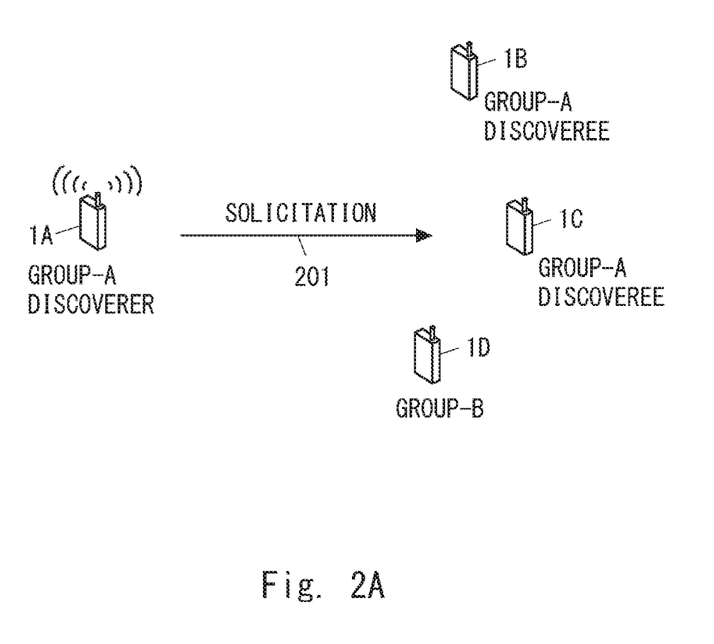
FIG. 2A is a diagram showing transmission of a solicitation message in the direct discovery model B (solicitation/response model)

As is understood from the above description of the model B group member discovery and the model B relay discovery, a plurality of discoveree UEs could transmit response messages to a single solicitation message transmitted from a single discoverer UE. This is specifically described with reference to FIGS. 2A and 2B. FIG. 2A shows that a discoverer UE 1A belonging to or associated with a group A transmits a solicitation message 201. The solicitation message 201 is transmitted in order to find any UE belonging to or associated with the group A. For example, the solicitation message 201 may be a Group Member Discovery Solicitation message (Model B) containing a Discovery Group ID associated with the group A. Note that, the group in this case may be defined by a connectivity service which a UE is interested in. Thus, the "group A" in FIG. 2A may be replaced with the service A. The solicitation message 201 may be a UE-to-Network Relay Discovery Solicitation message (Model B) containing a Relay Service Code associated with the service A.

Figure 2B:
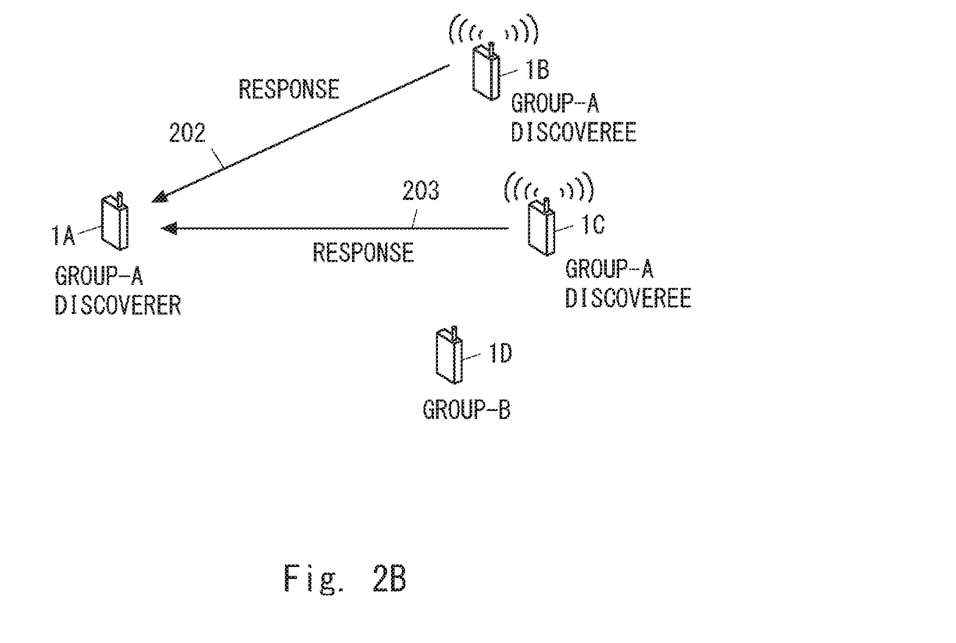
FIG. 2B is a diagram showing transmission of a response message in the direct discovery model B (solicitation/response model)

FIG. 2B shows that discoveree UEs 1B and 1C belonging to or associated with the group A transmit response messages 202 and 203, respectively. A UE 1D receives the solicitation message 201 but does not reply to the discoverer UE 1A because the value of the received Discovery Group ID or Relay Service Code does not match the one it has. The discoveree UEs 1B and 1C could possibly transmit the response messages 202 and 203 substantially at the same time, i.e., in the same sub-frame. Specifically, FIG. 2B shows that many-to-one communication from the discoveree UEs 1B and 1C to one discoverer UE 1A can possibly occur.

When the eNB 2 uses scheduled resource allocation (i.e., sidelink discovery Type 2) for allocation of direct discovery radio resources and allocates the same direct discovery radio resource to the UE 1B and the UE 1C, the response messages 202 and 203 could possibly be transmitted on the same radio resource. Note that, in the existing sidelink discovery Type 2, a UE transmits a Sidelink UE Information message containing "discTxResourceReq" information element (IE) to an eNB in order to request the eNB to allocate a direct discovery radio resource. The Sidelink UE Information message is an RRC message. The "discTxResourceReq" IE indicates the number of separate discovery messages which the UE desires to transmit in every discovery period. The eNB takes "discTxResourceReq" IE into consideration for allocation of direct discovery radio resources. For example, the eNB allocates, to a UE, radio resources required to transmit a certain number of discovery messages corresponding to the number indicated by "discTxResourceReq" IE in every discovery period. It should be noted, however, that when the eNB allocates direct discovery radio resources, no consideration is given to a UE group (or connectivity service) which a UE belongs to or is associated with. Thus, according to the existing direct discovery radio resource allocation, the same direct discovery radio resource could possibly be allocated to both the discoveree UEs 1B and 1C that reply to the same discovery solicitation message from the discoverer UE 1A.

To overcome this problem, the eNB 2 according to this embodiment is configured as follows. The eNB 2 is configured to receive a group identifier from each UE 1 that requests allocation of a direct discovery radio resource. The group identifier indicates a UE group (or connectivity service) associated with each UE 1. Further, the eNB 2 is configured to take the group identifier received from each UE 1 into consideration when allocating to each UE 1 a direct discovery radio resource, or particularly a radio resource for transmitting a response message of the direct discovery model B. To be specific, the eNB 2 prevents a direct discovery radio resource, which has already been allocated to a certain UE 1 that has sent a first group identifier indicating a first UE group, from being allocated to another UE 1 that has subsequently sent the same first group identifier. Meanwhile, the eNB 2 allows a direct discovery radio resource, which has already been allocated to a certain UE 1 that has sent a second group identifier indicating a second UE group, to be allocated to the UE 1 that has sent the first group identifier.

Stated differently, the eNB 2 is configured to allocate a second radio resource, rather than a first radio resource, for direct discovery performed by a first UE that has sent a first group identifier. The first radio resource is a direct discovery radio resource that has already been allocated to another UE that has sent the first group identifier. Meanwhile, the second radio resource is a direct discovery radio resource that has already been allocated to another UE that has sent a second group identifier indicating a second UE group different from the first UE group.

The group identifier sent from each UE 1 to the eNB 2 may indicate a UE group to which each UE 1 belongs, or may indicate the destination of a message to be transmitted by each UE 1. In some implementations, the group identifier may be sent from each UE 1 to the eNB 2 in order to inform the eNB 2 about the destination of one-to-many ProSe (D2D) direct communication, not the destination of ProSe (D2D) direct discovery. In other words, the eNB 2 may take a destination group identifier of ProSe (D2D) direct communication into consideration for radio resource allocation of ProSe (D2D) direct discovery. To be specific, the destination group identifier of ProSe (D2D) direct communication may be a ProSe Layer-2 Group ID indicated by a "destinationInfoList" IE contained in a Sidelink UE Information message transmitted from each UE 1 to the eNB 2.

In general, ProSe (D2D) direct discovery is used to find a destination UE of ProSe (D2D) direct communication, and ProSe (D2D) direct communication is performed subsequently to ProSe (D2D) direct discovery. Thus, a plurality of UEs 1 that have sent the same destination group identifier of ProSe (D2D) direct communication are likely to be associated with the same Discovery Group ID or the same Relay Service Code for model B group member discovery or model B relay discovery. Therefore, it is reasonable to reuse the destination group identifier of ProSe (D2D) direct communication as the group identifier of ProSe (D2D) direct discovery. Further, this implementation has an advantage that there is no need for modification of the Sidelink UE Information message sent from each UE 1 to the eNB2.

However, alternatively, the eNB2 may receive from each UE 1 a group identifier for ProSe (D2D) direct discovery, separately from a destination group identifier of ProSe (D2D) direct communication. In other words, each UE 1 may transmit to the eNB 2 a group identifier for ProSe (D2D) direct discovery, separately from a destination group identifier of ProSe (D2D) direct communication. The group identifier for ProSe (D2D) direct discovery may be a Discovery Group ID or a Relay Service Code.

Figure 3:
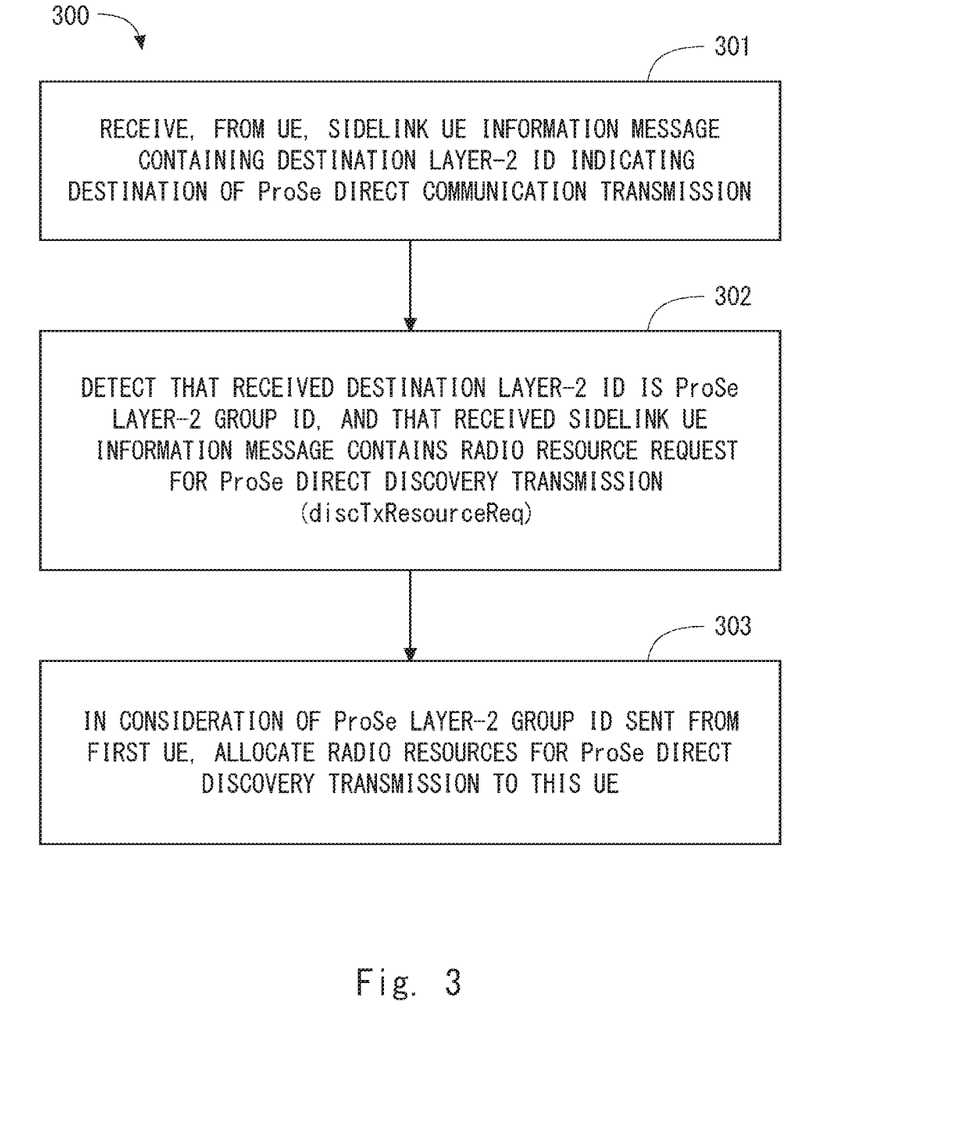
FIG. 3 is a flowchart showing one example of an operation of a base station according to the first embodiment.

FIG. 3 is a flowchart showing a process 300 that is an example of an operation of the eNB 2 according to this embodiment. In Step 301, the eNB 2 receives, from the UE 1, a Sidelink UE Information message containing a Destination Layer-2 ID indicating a destination of ProSe direct communication transmission. In Step 302, the eNB 2 detects that the received Destination Layer-2 ID is a ProSe Layer-2 Group ID, and that the received Sidelink UE Information message contains a radio resource request for ProSe direct discovery transmission (discTxResourceReq). In Step 303, considering the ProSe Layer-2 Group ID sent from the UE 1, the eNB 2 allocates a radio resource for ProSe direct discovery transmission to this UE 1.

Specifically, in the example of FIG. 3, the eNB 2 takes the ProSe Layer-2 Group ID indicating the destination of ProSe (D2D) direct communication into consideration for allocation of ProSe (D2D) direct discovery radio resources. For example, the eNB 2 prevents a direct discovery radio resource, which has already been allocated to a certain UE 1 that has sent a first ProSe Layer-2 Group ID indicating a first UE group, from being allocated to another UE 1 that has subsequently sent the same ProSe Layer-2 Group ID. Meanwhile, the eNB 2 allows a direct discovery radio resource, which has already been allocated to a certain UE 1 that has sent a second ProSe Layer-2 Group ID indicating a second UE group, to be allocated to the UE 1 that has sent the first ProSe Layer-2 Group ID.

Figure 4:
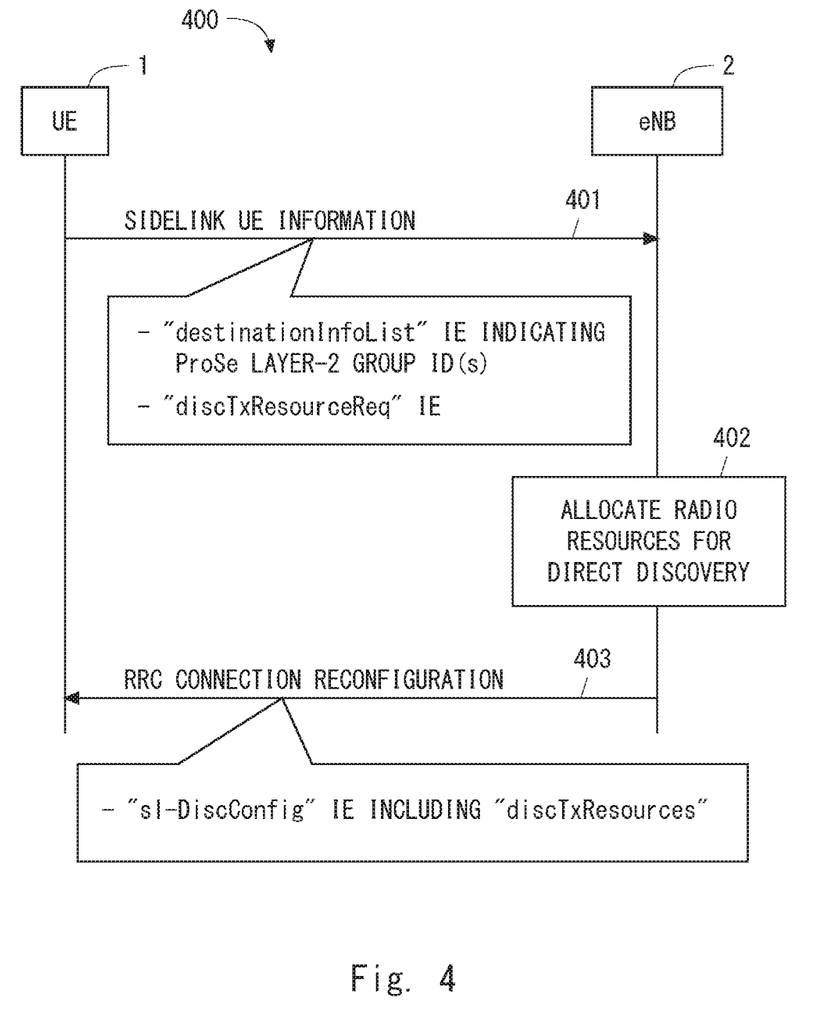
FIG. 4 is a sequence diagram showing one example of a procedure for allocating direct discovery radio resources according to the first embodiment.

FIG. 4 is a sequence showing a procedure 400 that is an example of a procedure for allocating a direct discovery radio resource according to this embodiment. In Step 401, the UE 1 transmits a Sidelink UE Information message to the eNB 2. This Sidelink UE Information message is an RRC message, and it contains a "destinationInfoList" IE and a "discTxResourceReq" IE. The "destinationInfoList" IE indicates a destination(s) of relay or non-relay related one-to-one or one-to-many sidelink communication. To be specific, for one-to-many sidelink communication, the "destinationInfoList" IE indicates a ProSe Layer-2 Group ID(s). The "discTxResourceReq" IE requests to the eNB 2 to allocate a direct discovery radio resource. To be specific, the "discTxResourceReq" IE indicates the number of separate discovery messages which the UE 1 desires to transmit in every discovery period.

In Step 402, the eNB 2 allocates direct discovery radio resources to the UE 1 in consideration of the ProSe Layer-2 Group ID(s) received from the UE 1. As described earlier, the eNB 2 may inhibit allocation of the same discovery radio resources to a plurality of UEs that have sent the same ProSe Layer-2 Group ID(s).

In Step 403, the eNB 2 transmits an RRC Connection Reconfiguration message containing a "s1-DiscConfig" IE to the UE 1. The "s1-DiscConfig" IE contains a "discTxResources" field indicating the direct discovery radio resources allocated to the UE 1.

As is understood from the above description, the eNB 2 according to this embodiment avoids allocation of the same direct discovery radio resource to a plurality of UEs 1 associated with the same group identifier. Therefore, the radio resource allocation by the eNB 2 according to this embodiment contributes to preventing response messages from a plurality of UEs in the direct discovery model B from being transmitted in the same resource.

Note that, one of the cases where the radio resource allocation according to this embodiment is particularly effective is allocation of radio resources to many-to-one D2D communication transmission, such as transmission of response messages in the direct discovery model B. Thus, the eNB 2 may recognize a discovery model to which the direct discovery performed by each UE 1 conforms, and allocate radio resources in consideration of the direct discovery model to which each UE 1 conforms. To achieve this, each UE 1 may include discovery model information into a radio resource allocation request for direct discovery (e.g., a "discTxResourceReq" IE in a Sidelink UE Information message). The discovery model information indicates whether or not the direct discovery to be performed by the UE 1 conforms to any discovery model that involves transmission of response messages by one or more discoveree UEs. The discovery model information may indicate which of the ProSe discovery model A and the model B the direct discovery performed by each UE 1 is.

In addition or alternatively, a request for radio resource allocation for direct discovery (e.g., a "discTxResourceReq" IE in a Sidelink UE Information message) from each UE 1 may indicate which of the solicitation message transmission or the response message transmission a direct discovery radio resource is required for. The eNB 2 may consider a group identifier in the case of direct discovery radio resource allocation for the response message transmission. Meanwhile, the eNB 2 may does not consider a group identifier in the case of direct discovery radio resource allocation for the solicitation message transmission. This improves the usage efficiency of direct discovery radio resources.

Second Embodiment

A configuration example of a radio communication network according to this embodiment is similar to the configuration example of the radio communication network according to the first embodiment. As described in the first embodiment, each UE 1 may be associated with a plurality of UE groups (or connectivity services). This embodiment provides a modified example of a radio resource allocation request described in the first embodiment, which is an example directed to radio resource allocation to the UE 1 associated with a plurality of UE groups.

Figure 5:
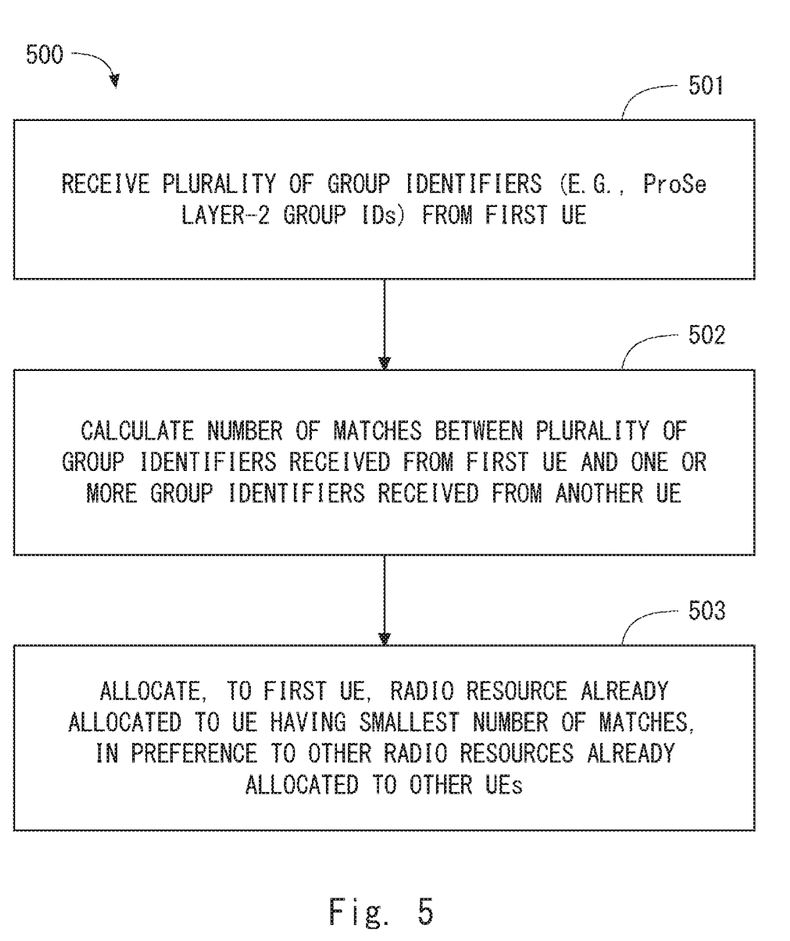
FIG. 5 is a flowchart showing one example of an operation of a base station according to a second embodiment.

FIG. 5 is a flowchart showing a process 500 that is an example of an operation of the eNB 2 according to this embodiment. In Step 501, the eNB 2 receives, from the UE 1 (hereinafter as the first UE), a plurality of group identifiers (e.g., ProSe LAYER-2 GROUP IDs). In Step S502, the eNB 2 calculates the number of matches between the plurality of group identifiers received from the first UE and one or more group identifiers received from another UE 1. The eNB 2 carries out the calculation of the number of matches in Step 502 for respective UEs to which any discovery radio resources have already been allocated. In Step 503, the eNB 2 allocates, to the first UE, a direct discovery radio resource that has already been allocated to the UE 1 where its calculated number of matches is the smallest, in preference to other direct discovery radio resources that have already been allocated to the other UEs 1. The number of matches of group identifiers between two UEs 1 can be rephrased as the number of elements of a common part (or intersection) between the one or more UE groups to which one UE 1 belongs and the one or more UE groups to which the other UE 1 belongs.

In some implementations, the eNB 2 may calculate the total count by summing up the numbers of matches between the one or more UE groups to which each UE 1 that each radio resource has already been allocated to belongs and the one or more UE groups to which the first UE that this radio resource is to be newly allocated to belongs. Then, the eNB 2 may use the obtained total count as a metric for each radio resource. The eNB 2 may allocate the direct discovery radio resources having the smallest metric preferentially to the first UE. The metric f(N) of each radio resource N is represented by the following equation:

$$f(N) = \sum_{UE_k \in allocated(N)} g(UE_{new}, UE_k),$$

where $UE_{new}$ is the UE 1 (the first UE) to which the radio resource is to be newly allocated, $UE_k$ is a UE belonging to the set of UEs to which the radio resource N have already been allocated, and $g(UE_{new}, UE_k)$ is the number of matches in UE group between $UE_{new}$ and $UE_k$.

Figure 6:
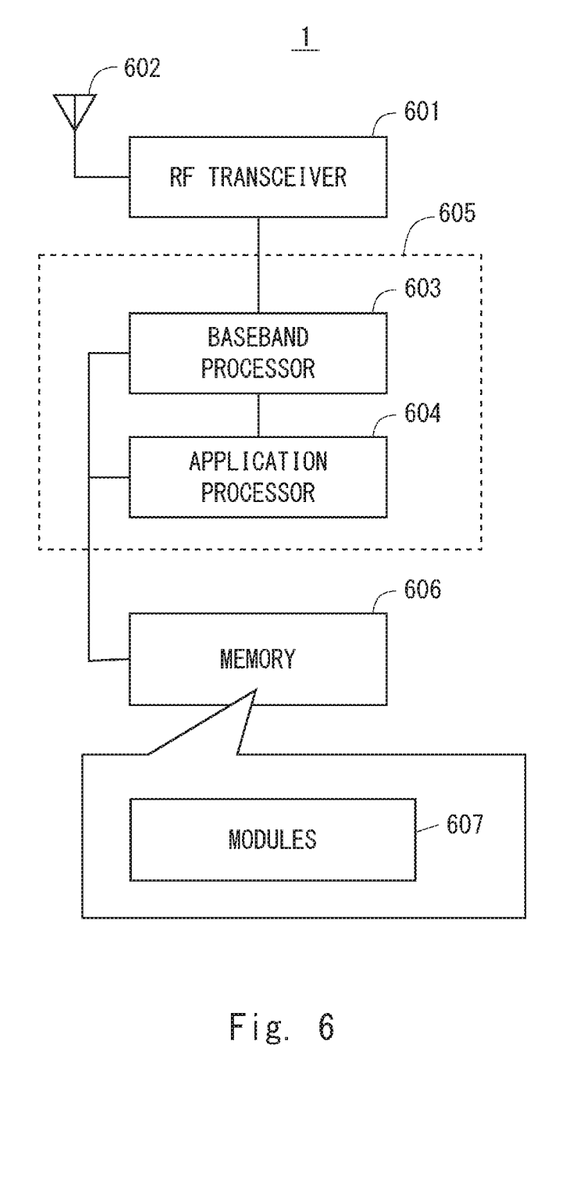
FIG. 6 is a block diagram showing a configuration example of a wireless terminal according to several embodiments.

In the following, configuration examples of the UE 1 and the eNB 2 according to the above-described embodiments will be described. FIG. 6 is a block diagram showing a configuration example of the UE 1. A Radio Frequency (RF) transceiver 601 performs analog RF signal processing for communication with the eNB 2. The analog RF signal processing performed by the RF transceiver 601 includes frequency up-conversion, frequency down-conversion, and amplification. The RF transceiver 601 is connected to an antenna 602 and a baseband processor 603. Specifically, the RF transceiver 601 receives modulated symbol data (or OFDM symbol data) from the baseband processor 603, generates a transmission RF signal and supplies the transmission RF signal to the antenna 602. Further, the RF transceiver 601 generates a baseband received signal based on a received RF signal received by the antenna 602 and supplies it to the baseband processor 603.

The RF transceiver 601 may also be used for sidelink communication with other UEs. The RF transceiver 601 may include a plurality of transceivers.

The baseband processor 603 performs digital baseband signal processing (i.e., data-plane processing) and control-plane processing for wireless communication. The digital baseband signal processing includes (a) data compression/decompression, (b) data segmentation/concatenation, (c) composition/decomposition of a transmission format (i.e., transmission frame), (d) channel encoding/decoding, (e) modulation (i.e., symbol mapping)/demodulation, and (f) OFDM symbol data (baseband OFDM signal) generation by Inverse Fast Fourier Transform (IFFT). On the other hand, the control-plane processing includes communication management of Layer 1 (e.g., transmission power control), Layer 2 (e.g., radio resource management and hybrid automatic repeat request (HARQ) processing), and Layer 3 (e.g., signaling regarding attach, mobility, and call management).

For example, in the case of LTE and LTE-Advanced, the digital baseband signal processing performed by the baseband processor 603 may include signal processing of Packet Data Convergence Protocol (PDCP) layer, Radio Link Control (RLC) layer, MAC layer, and PHY layer. Further, the control-plane processing performed by the baseband processor 603 may include processing of the Non-Access Stratum (NAS) protocol, RRC protocol, and MAC CEs.

The baseband processor 603 may include a modem processor (e.g., Digital Signal Processor (DSP)) that performs digital baseband signal processing and a protocol stack processor (e.g., Central Processing Unit (CPU) or Micro Processing Unit (MPU)) that performs control plane processing. In this case, the protocol stack processor that performs control plane processing may be made common to an application processor 604, which is described below.

The application processor 604 is also referred to as a CPU, an MPU, a microprocessor or a processor core. The application processor 604 may include a plurality of processors (a plurality of processor cores). The application processor 604 loads a system software program (Operating System (OS)) and various application programs (e.g., voice call application, WEB browser, mailer, camera operation application, and music player application) from a memory 606 or from another memory (not shown) and executes these programs, thereby providing various functions of the UE 1.

In some implementations, as represented by a dashed line (605) in FIG. 6, the baseband processor 603 and the application processor 604 may be integrated on a single chip. In other words, the baseband processor 603 and the application processor 604 may be implemented in a single System on Chip (SoC) device 605. A SoC device may be referred to as a system Large Scale Integration (LSI) or a chipset.

The memory 606 is a volatile memory, a nonvolatile memory, or a combination thereof. The memory 606 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 606 may include, for example, an external memory device that can be accessed by the baseband processor 603, the application processor 604, and the SoC 605. The memory 606 may include an internal memory device that is integrated in the baseband processor 603, the application processor 604, or the SoC 605. Further, the memory 606 may include a memory in a Universal Integrated Circuit Card (UICC).

The memory 606 may store one or more software modules (or computer programs) 607 including instructions and data to perform processing by the UE 1 described in the above embodiments. In some implementations, the baseband processor 603 or the application processor 604 may be configured to load the software modules 607 from the memory 606 and execute the loaded software modules, thereby performing the processing of the UE 1 described in the above embodiments with reference to the drawings.

Figure 7:
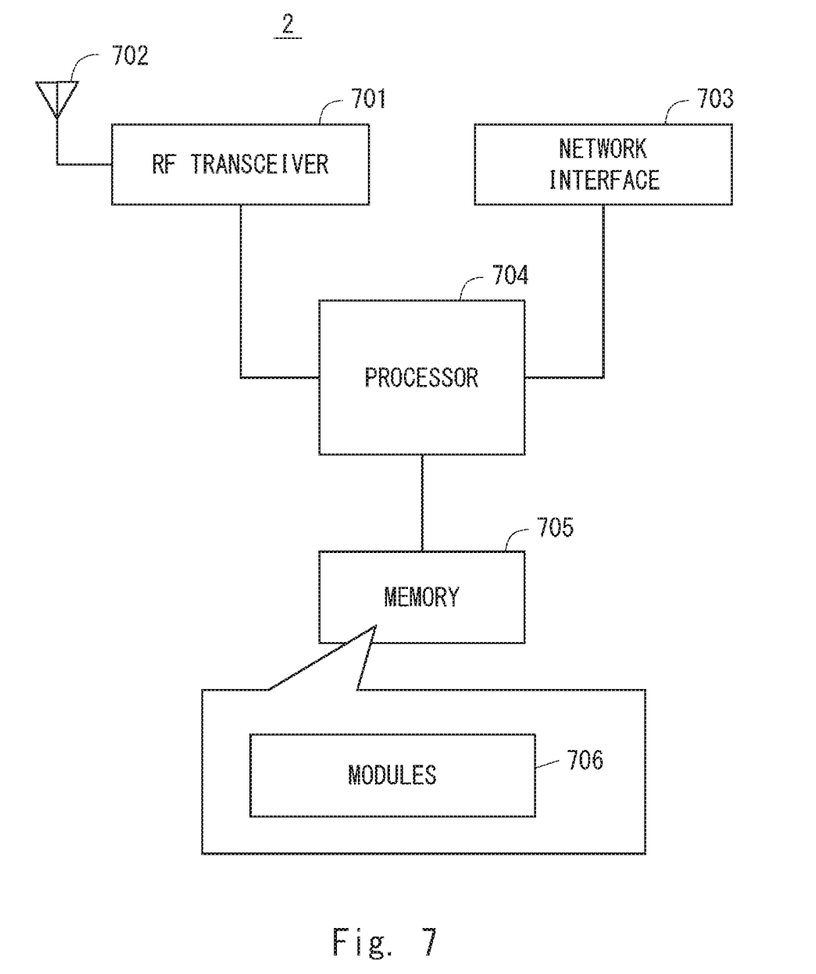
FIG. 7 is a block diagram showing a configuration example of a base station according to several embodiments.

FIG. 7 is a block diagram showing a configuration example of the eNB 2 according to the above-described embodiments. Referring to FIG. 7, the eNB 2 includes an RF transceiver 701, a network interface 703, a processor 704, and a memory 705. The RF transceiver 701 performs analog RF signal processing to communicate with UEs 1. The RF transceiver 701 may include a plurality of transceivers. The RF transceiver 701 is connected to an antenna 702 and a processor 704. The RF transceiver 701 receives modulated symbol data (or OFDM symbol data) from the processor 704, generates a transmission RF signal and supplies the transmission RF signal to the antenna 702. Further, the RF transceiver 701 generates a baseband received signal based on a received RF signal received by the antenna 702 and supplies it to the processor 704.

The network interface 703 is used to communicate with a network node (e.g., Mobility Management Entity (MME) and Serving Gateway (S-GW)). The network interface 703 may include, for example, a network interface card (NIC) conforming to the IEEE 802.3 series.

The processor 704 performs digital baseband signal processing (i.e., data-plane processing) and control-plane processing for wireless communication. For example, in the case of LTE and LTE-Advanced, the digital baseband signal processing performed by the processor 704 may include signal processing of the PDCP layer, RLC layer, MAC layer and PHY layer. Further, the control-plane processing by the processor 704 may include processing of the S1 protocol, RRC protocol and MAC CEs.

The processor 704 may include a plurality of processors. For example, the processor 704 may include a modem processor (e.g., DSP) that performs the digital baseband signal processing and a protocol stack processor (e.g., CPU or MPU) that performs the control-plane processing.

The memory 705 is a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or any combination thereof. The memory 705 may include a storage that is placed apart from the processor 704. In this case, the processor 704 may access the memory 705 through the network interface 703 or an I/O interface (not shown).

The memory 705 may store one or more software modules (or computer programs) 706 including instructions and data to perform processing by the eNB 2 described in the above described plurality of embodiments. In some implementations, the processor 704 may be configured to load the software modules 706 from the memory 705 and execute the loaded software modules, thereby performing the processing of the eNB 2 described in the above described embodiments with reference to the drawings.

As described with reference to FIGS. 6 and 7, each of the processors included in the UE 1 and the eNB 2 according to the above-described embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

The processes and operations performed by the eNB 2 described in the above embodiments may be provided by a Central Unit (CU), or by a combination of the CU and a Distributed Unit (DU), included in a Cloud Radio Access Network (C-RAN) architecture. The CU is also referred to as a Baseband Unit (BBU). The DU is also referred to as a Remote Radio Head (RRH) or Remote Radio Equipment (RRE). That is, the processes and operations performed by the eNB 2 described in the above embodiments may be provided by one or a plurality of radio stations (i.e., RAN nodes).

The above embodiments describe the radio resource allocation by the eNB 2 for the model B direct discovery. In the above embodiments, the eNB 2 may perform radio resource allocation for response message transmission by the discoveree UEs, but it may not perform radio resource allocation for solicitation message transmission by the discoverer UE. To be specific, the discoverer UE may autonomously select radio resources from a discovery resource pool in accordance with autonomous resource selection (sidelink discovery Type 1).

The above embodiments provide the examples in which the eNB 2 allocates direct discovery radio resources in a semi-persistent manner. Alternatively, the eNB 2 may allocate direct discovery radio resources in a dynamic manner every discovery period (i.e., PSDCH period). However, the problem of a collision of radio resources for model B response messages described in the above embodiments may occur particularly in the case of semi-persistent resource allocation. The "semi-persistent resource allocation" means a case where when radio resource allocation to a new UE is performed, radio resources allocated to other UEs has already been determined and thus it is difficult to change the allocated radio resources to these other UEs.

The radio resource allocation performed by the eNB 2 described in the above embodiments can be applied to allocation of radio resources for direct communication, as well as allocation of radio resources for direct discovery. As described earlier, the radio resource allocation by the eNB 2 described in the above embodiments is particularly effective for radio resource allocation to many-to-one D2D communication transmission, such as, for example, transmission of response messages in the direct discovery model B.

The above embodiments can be applied not only to D2D communication and direct discovery in ProSe as described in the examples above, but also to Vehicle-to-Everything (V2X) communication including Vehicle-to-Vehicle (V2V) communication, Vehicle-to-Infrastructure (V2I) communication, and Vehicle-to-Pedestrian (V2P) communication, which uses a framework similar to that of D2D communication and direct discovery in ProSe.

Furthermore, the embodiments stated above are merely examples of application of the technical ideas obtained by the present inventor. Needless to say, these technical ideas are not limited to those described in the above embodiments and may be changed in various ways.

For example, the whole or part of the embodiments disclosed above can be described as, but not limited to, the following Supplementary Notes.

(Supplementary Note 1)
A base station comprising:
at least one memory; and
at least one processor coupled to the at least one memory and configured to:
receive, from a first wireless terminal, a first group identifier indicating a first terminal group; and
allocate, to the first wireless terminal, a second radio resource, rather than a first radio resource, for device-to-device (D2D) communication performed by the first wireless terminal, wherein
the first radio resource is a radio resource which has already been allocated to any other wireless terminal which has sent the first group identifier, and
the second radio resource is a radio resource which has already been allocated to any other wireless terminal which has sent a second group identifier indicating a second terminal group different from the first terminal group.

(Supplementary Note 2)
The base station according to Supplementary Note 1, wherein the first and second radio resources are used for D2D direct discovery.

(Supplementary Note 3)
The base station according to Supplementary Note 2, wherein the D2D direct discovery is performed by transmitting a solicitation message by a discoverer wireless terminal and transmitting a response message by one or more discoveree wireless terminals in response to receiving the solicitation message.

(Supplementary Note 4)
The base station according to Supplementary Note 3, wherein the first and second radio resources are used for transmitting the response message.

(Supplementary Note 5)
The base station according to Supplementary Note 3 or 4, wherein
the at least one processor is configured to receive, from the first wireless terminal, a request for radio resource allocation for the D2D direct discovery, and
the request indicates whether the radio resource allocation is for transmission of the solicitation message or for transmission of the response message.

(Supplementary Note 6)
The base station according to Supplementary Note 3 or 4, wherein the at least one processor is configured to receive, from the first wireless terminal, a request for radio resource allocation for the D2D direct discovery, and
the request indicates whether the D2D direct discovery conforms to a discovery model which involves transmission of a response message by one or more discoveree wireless terminals.

(Supplementary Note 7)
The base station according to any one of Supplementary Notes 2 to 6, wherein the first group identifier and the second group identifier are sent to the base station by the first wireless terminal and the other wireless terminal, respectively, in order to inform the base station about a destination of one-to-many D2D direct communication, not a destination of the D2D direct discovery.

(Supplementary Note 8)
The base station according to Supplementary Note 7, wherein each of the first group identifier and the second group identifier is a ProSe Layer-2 Group ID indicated by a destinationInfoList information element contained in a Sidelink UE Information message.

(Supplementary Note 9)
The base station according to any one of Supplementary Notes 2 to 6, wherein each of the first group identifier and the second group identifier is a Discovery Group ID or a Relay Service Code.

(Supplementary Note 10)

The base station according to any one of Supplementary Notes 2 to 9, wherein the first group identifier is contained in a first Radio Resource Control (RRC) message sent from the first wireless terminal, and the at least one processor is configured to transmit, to the first wireless terminal, a second RRC message indicating a radio resource allocated to the first wireless terminal for transmission related to the D2D direct discovery.

(Supplementary Note 11)

The base station according to Supplementary Note 10, wherein the first RRC message is a Sidelink UE Information message, and the second RRC message is an RRC Connection Reconfiguration message.

(Supplementary Note 12)

The base station according to any one of Supplementary Notes 1 to 11, wherein the first and second radio resources are used for many-to-one D2D communication where simultaneous transmission from a plurality of wireless terminals to one wireless terminal occurs.

(Supplementary Note 13)

The base station according to any one of Supplementary Notes 1 to 12, wherein the at least one processor is configured to allocate, to the first wireless terminal, a radio resource that has already been allocated to one wireless terminal having a smallest number of matches between one or more terminal groups to which the one wireless terminal belongs and one or more terminal groups to which the first wireless terminal belongs, in preference to other radio resources that have already allocated to other radio terminals.

(Supplementary Note 14)

The base station according to Supplementary Note 13, wherein the at least one processor is configured to calculate a total count by summing up numbers of matches between one or more terminal groups to which the first wireless terminal belongs and one or more terminal groups to which each of one or more wireless terminals which each radio resource has been already allocated to belongs, and the at least one processor is configured to use the total count as a metric for the each radio resource.

(Supplementary Note 15)

A method for a base station, the method comprising:

receiving, from a first wireless terminal, a first group identifier indicating a first terminal group; and allocating, to the first wireless terminal, a second radio resource, rather than a first radio resource, for device-to-device (D2D) communication performed by the first wireless terminal, wherein the first radio resource is a radio resource which has already been allocated to any other wireless terminal which has sent the first group identifier, and the second radio resource is a radio resource which has already been allocated to any other wireless terminal which has sent a second group identifier indicating a second terminal group different from the first terminal group.

(Supplementary Note 16)

A program for causing a computer to perform a method for a base station, wherein the method comprises:

receiving, from a first wireless terminal, a first group identifier indicating a first terminal group; and allocating, to the first wireless terminal, a second radio resource, rather than a first radio resource, for device-to-device (D2D) communication performed by the first wireless terminal, wherein the first radio resource is a radio resource which has already been allocated to any other wireless terminal which has sent the first group identifier, and the second radio resource is a radio resource which has already been allocated to any other wireless terminal which has sent a second group identifier indicating a second terminal group different from the first terminal group.

This application is based upon and claims the benefit of priority from Japanese Patent Application No. 2016-176285 filed on Sep. 9, 2016, and the disclosure of which is incorporated herein in its entirety by reference.

REFERENCE SIGNS LIST

1 Wireless terminal (UE)
2 Base Station (eNB)
3 Core Network
4 D2D Controller
601 Radio Frequency (RF) Transceiver
603 Baseband Processor
604 Application Processor
606 Memory
704 Processor
705 Memory

What is claimed is:

1. A base station comprising:
at least one memory; and
at least one processor coupled to the at least one memory and configured to:
  receive, from a first wireless terminal, a first group identifier indicating a first terminal group; and
  allocate, to the first wireless terminal, a second radio resource, rather than a first radio resource, for transmitting a device-to-device (D2D) communication signal to a wireless terminal associated with the first terminal group, wherein
the first radio resource is a radio resource which has already been allocated by the base station to a second wireless terminal which has sent the first group identifier to the base station, the first radio resource is used by the second wireless terminal to transmit a D2D communication signal to a wireless terminal associated with the first terminal group, and
the second radio resource is a radio resource which has already been allocated by the base station to a third wireless terminal which has sent to the base station a second group identifier indicating a second terminal group different from the first terminal group, the second radio resource is used by the third wireless terminal to transmit a D2D communication signal to a wireless terminal associated with the second terminal group.

2. The base station according to claim 1, wherein the first and second radio resources are used for D2D direct discovery.

3. The base station according to claim 2, wherein the D2D direct discovery is performed by transmitting a solicitation message by a discoverer wireless terminal and transmitting a response message by one or more discoveree wireless terminals in response to receiving the solicitation message.

4. The base station according to claim 3, wherein the first and second radio resources are used for transmitting the response message.

5. The base station according to claim 3, wherein
the at least one processor is configured to receive, from the first wireless terminal, a request for radio resource allocation for the D2D direct discovery, and
the request indicates whether the radio resource allocation is for transmission of the solicitation message or for transmission of the response message.

6. The base station according to claim 5, wherein the at least one processor is configured to allocate D2D radio resources to the first wireless terminal while considering which of the solicitation message or the response message the D2D radio resources are to be used for.

7. The base station according to claim 3, wherein
the at least one processor is configured to receive, from the first wireless terminal, a request for radio resource allocation for the D2D direct discovery, and
the request indicates whether the D2D direct discovery conforms to a discovery model which involves transmission of a response message by one or more discoveree wireless terminals.

8. The base station according to claim 7, wherein the at least one processor is configured to allocate D2D radio resources to the first wireless terminal in consideration of the discovery model to which the first wireless terminal conforms.

9. The base station according to claim 2, wherein the first group identifier and the second group identifier are sent to the base station by the first wireless terminal and the other wireless terminal, respectively, in order to inform the base station about a destination of one-to-many D2D direct communication, not a destination of the D2D direct discovery.

10. The base station according to claim 9, wherein each of the first group identifier and the second group identifier is a ProSe Layer-2 Group ID indicated by a destinationInfoList information element contained in a Sidelink UE Information message.

11. The base station according to claim 2, wherein each of the first group identifier and the second group identifier is a Discovery Group ID or a Relay Service Code.

12. The base station according to claim 2, wherein
the first group identifier is contained in a first Radio Resource Control (RRC) message sent from the first wireless terminal, and
the at least one processor is configured to transmit, to the first wireless terminal, a second RRC message indicating a radio resource allocated to the first wireless terminal for transmission related to the D2D direct discovery.

13. The base station according to claim 12, wherein
the first RRC message is a Sidelink UE Information message, and
the second RRC message is an RRC Connection Reconfiguration message.

14. The base station according to claim 1, wherein the first and second radio resources are used for many-to-one D2D communication where simultaneous transmission from a plurality of wireless terminals to one wireless terminal occurs.

15. The base station according to claim 1, wherein the at least one processor is configured to allocate, to the first wireless terminal, a radio resource that has already been allocated to one wireless terminal having a smallest number of matches between one or more terminal groups to which the one wireless terminal belongs and one or more terminal groups to which the first wireless terminal belongs, in preference to other radio resources that have already allocated to other wireless terminals.

16. The base station according to claim 15, wherein
the at least one processor is configured to calculate a total count by summing up numbers of matches between one or more terminal groups to which the first wireless terminal belongs and one or more terminal groups to which each of one or more wireless terminals which each radio resource has been already allocated to belongs, and
the at least one processor is configured to use the total count as a metric for the each radio resource.

17. A method for a base station, the method comprising:
receiving, from a first wireless terminal, a first group identifier indicating a first terminal group; and
allocating, to the first wireless terminal, a second radio resource, rather than a first radio resource, for transmitting a device-to-device (D2D) communication signal to a wireless terminal associated with the first terminal group, wherein
the first radio resource is a radio resource which has already been allocated by the base station to a second wireless terminal which has sent the first group identifier to the base station, the first radio resource is used by the second wireless terminal to transmit a D2D communication signal to a wireless terminal associated with the first terminal group, and
the second radio resource is a radio resource which has already been allocated by the base station to a third wireless terminal which has sent to the base station a second group identifier indicating a second terminal group different from the first terminal group, the second radio resource is used by the third wireless terminal to transmit a D2D communication signal to a wireless terminal associated with the second terminal group.

18. A non-transitory computer readable medium storing a program for causing a computer to perform a method for a base station, wherein the method comprises:
receiving, from a first wireless terminal, a first group identifier indicating a first terminal group; and
allocating, to the first wireless terminal, a second radio resource, rather than a first radio resource, for transmitting a device-to-device (D2D) communication signal to a wireless terminal associated with the first terminal group, wherein
the first radio resource is a radio resource which has already been allocated by the base station to a second wireless terminal which has sent the first group identifier to the base station,
the first radio resource is used by the second wireless terminal to transmit a D2D communication signal to a wireless terminal associated with the first terminal group, and
the second radio resource is a radio resource which has already been allocated by the base station to a third wireless terminal which has sent to the base station a second group identifier indicating a second terminal group different from the first terminal group, the second radio resource is used by the third wireless terminal to transmit a D2D communication signal to a wireless terminal associated with the second terminal group.

* * * * *